No. 840,333. PATENTED JAN. 1, 1907.
T. HUSSEY.
MINER'S GOLD PAN.
APPLICATION FILED APR. 30, 1906.
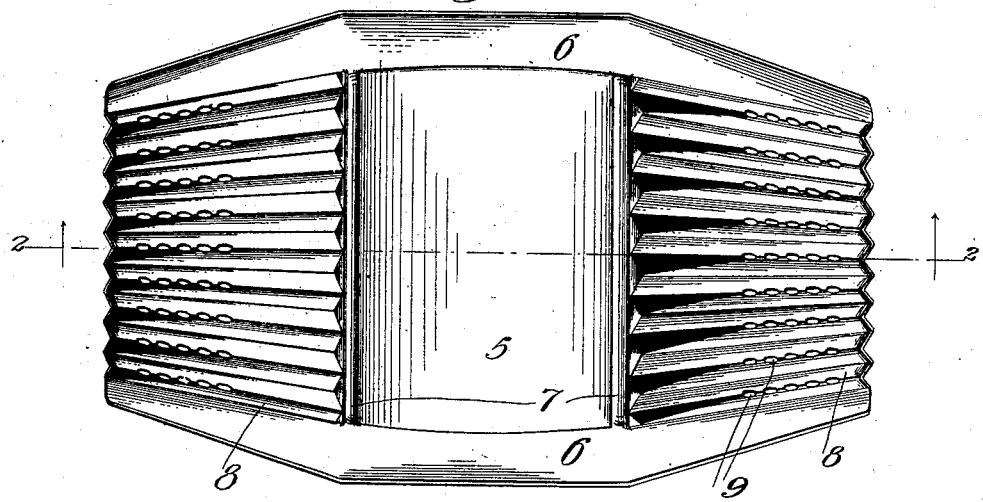
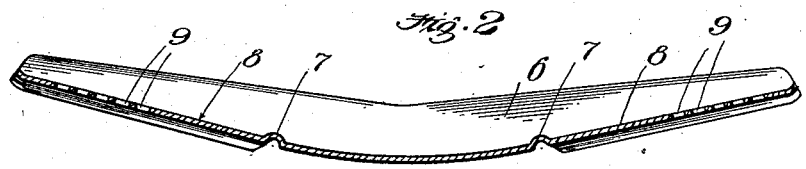
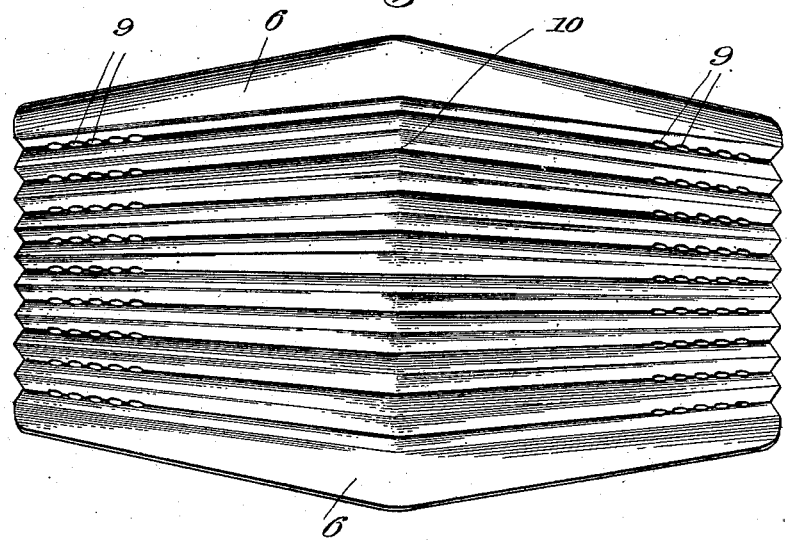
Witnesses
Inventor
Thomas Hussey
By Hazard & Harpham
Attorneys.

UNITED STATES PATENT OFFICE.

THOMAS HUSSEY, OF HOLLYWOOD, CALIFORNIA.

MINER'S GOLD-PAN.

No. 840,333.  Specification of Letters Patent.  Patented Jan. 1, 1907.

Application filed April 30, 1906. Serial No. 314,359.

*To all whom it may concern:*

Be it known that I, THOMAS HUSSEY, a citizen of the United States, residing at Hollywood, in the county of Los Angeles and State of California, have invented new and useful Improvements in Miners' Gold-Pans for Hand-Panning, of which the following is a specification.

In the common ordinary gold-pan for hand-panning the bottom is usually circular and slopes upwardly and outwardly, and all the lighter material passes out of the pan with the water over the edge. Unless very great care is used the water pours out in such a volume as to carry some of the lighter particles of gold with it.

It is the object of my improved gold-pan to provide means for the lighter particles and water to pass out through a plurality of openings at the apex of what might be termed "riffles" in that portion of the pan which I term the "ends" thereof, whereby there is less danger of the lighter particles of gold escaping and which divides the amount of water escaping into a number of small streams instead of one large stream, thereby enabling the operator to clear the pan of the water and lighter particles in much less time than can be done with the ordinary pan. I accomplish this object by the pan described herein, and illustrated in the accompanying drawings, in which—

Figure 1 is a plan of my preferred pan. Fig. 2 is a section on the line 2 2 of Fig. 1. Fig. 3 is a modified form.

In the drawings, 5 is that portion of the pan which I will term the "bottom" of the pan and is very nearly flat. It is provided at each side with side walls 6, which slope upwardly and outwardly. At each end of the central portion of the bottom are transverse ribs 7, which form what I term "transverse" riffles, and from these riffles the bottom or end walls 8 slope upwardly and outwardly on a gentle slant, and the extreme end turns upwardly sharply. The outer ends of the bottom are corrugated, thereby forming longitudinal riffles. The outer ends of these corrugations are provided with perforations 9 at the apex of each corrugation. The side walls 6 project along and form sides for the ends of the bottom. In Fig. 3 the bottom slopes in both directions from the central transverse line 10 upwardly and outwardly on a gentle slant, and the whole bottom is corrugated, with perforations at the outer ends of the corrugations the same as in Fig. 1.

By this construction when material to be panned is placed in the pan with sufficient water the ordinary movement of hand-panning enables the operator to throw the lighter particles upon the slanting ends over the riffles, and as it passes over the corrugations the heavier portions will sink into the lowest portion of the corrugations, while the lighter portions will pass out through the perforations in the apices of the corrugations, thus getting rid of the lighter portions much more quickly than is possible with the ordinary pan. Should there be stones in the material, they can be drawn diagonally across the corrugations by hand as they are removed from the pan, thereby preventing them from carrying out of the pan any small particles.

Having described my invention, what I claim as new is—

1. A hand gold-pan having a portion of the upper part of the end walls corrugated and having perforations at the apices of the outer portions of the corrugations.

2. A hand gold-pan having a portion of each end of the bottom sloping upwardly and outwardly and having perforations near the outer ends of such sloping portions.

3. A hand gold-pan having a portion of each end of the bottom sloping upwardly and outwardly and corrugated, said corrugations having perforations at the apices thereof near the outer ends.

4. A hand gold-pan having a portion of the bottom nearly level and the other portions sloping upwardly and outwardly and corrugated, said corrugations having perforations at the apices thereof near the outer ends; and riffles extending transversely the bottom between the smooth and corrugated portions.

5. A device of the class described, comprising a sheet-metal body having side walls, the end walls of said body sloping upwardly and outwardly from the center thereof, and having corrugations at their outer ends; and a plurality of perforations at the apex of each corrugation.

In witness that I claim the foregoing I have hereunto subscribed my name this 21st day of April, 1906.

THOMAS HUSSEY.

Witnesses:
G. E. HARPHAM,
EDMUND A. STRAUSE.